US012615615B2

(12) United States Patent
Singh et al.

(10) Patent No.: US 12,615,615 B2
(45) Date of Patent: Apr. 28, 2026

(54) ENHANCED LOCATION SERVICES IN 5G

(71) Applicant: Nokia Technologies Oy, Espoo (FI)

(72) Inventors: Shubhranshu Singh, Seeheim-Jugenheim (DE); Eva Perez, Munich (DE); Sean Kelley, Hoffman Estates, IL (US); Andreas Maeder, Würzburg (DE)

(73) Assignee: Nokia Technologies Oy, Espoo (FI)

( * ) Notice: Subject to any disclaimer, the term of this patent is extended or adjusted under 35 U.S.C. 154(b) by 41 days.

(21) Appl. No.: 17/492,342

(22) Filed: Oct. 1, 2021

(65) Prior Publication Data

US 2022/0110086 A1 Apr. 7, 2022

Related U.S. Application Data

(60) Provisional application No. 63/087,499, filed on Oct. 5, 2020.

(51) Int. Cl.
*H04W 64/00* (2009.01)
*H04W 48/16* (2009.01)
(Continued)

(52) U.S. Cl.
CPC ......... *H04W 64/003* (2013.01); *H04W 48/16* (2013.01); *H04W 48/18* (2013.01); *H04W 48/20* (2013.01); *H04W 64/00* (2013.01)

(58) Field of Classification Search
CPC ......... H04W 64/003; H04W 36/00835; H04W 36/14; H04W 36/32; H04W 48/16; H04W 48/18; H04W 48/20; H04W 64/00; H04W 88/14; H04W 36/12; H04W 8/065; H04W 8/186; H04W 4/029
(Continued)

(56) References Cited

U.S. PATENT DOCUMENTS 10,609,530 B1 3/2020 Patil et al.
2020/0329404 A1* 10/2020 Vikberg .............. H04L 65/1016
(Continued)

FOREIGN PATENT DOCUMENTS

CN 110784434 A 2/2020
CN 110913473 A 3/2020
(Continued)

OTHER PUBLICATIONS

Extended European Search Report received for corresponding European Patent Application No. 21200630.8, dated Mar. 10, 2022, 11 pages.
(Continued)

*Primary Examiner* — Michael Y Mapa
(74) *Attorney, Agent, or Firm* — Nokia Technologies Oy

(57) ABSTRACT

Systems, methods, apparatuses, and computer program products for enhanced location services in 5G are provided. One method may include storing, at a network node, at least one of data network access identifier(s) (DNAIs), an indication of serving area(s), and/or slice information that is supported by a location management function (LMF) with or in a LMF profile. The method may also include transmitting, to a consumer network function (NF), the LMF profile with the at least one of DNAIs, indication of serving area(s), or slice information supported by the LMF.

20 Claims, 7 Drawing Sheets

(51) Int. Cl.
  *H04W 48/18* (2009.01)
  *H04W 48/20* (2009.01)

(58) Field of Classification Search
  USPC ............................................. 455/456.1–457
  See application file for complete search history.

(56) References Cited

U.S. PATENT DOCUMENTS

| | | | | |
|---|---|---|---|---|
| 2021/0360371 A1* | 11/2021 | Qiao | ..................... | H04W 4/029 |
| 2022/0007326 A1* | 1/2022 | Zhang | ................... | G01S 5/0205 |
| 2022/0191764 A1* | 6/2022 | Ni | .......................... | H04W 4/029 |
| 2022/0345996 A1* | 10/2022 | Jeong | ............... | H04W 28/0268 |
| 2023/0032185 A1* | 2/2023 | Lee | ........................ | H04W 60/00 |
| 2023/0199595 A1* | 6/2023 | Lu | .......................... | H04W 36/12 |
| | | | | 370/329 |
| 2023/0261953 A1* | 8/2023 | Lu | .......................... | H04L 67/55 |
| | | | | 709/223 |

FOREIGN PATENT DOCUMENTS

| | | |
|---|---|---|
| CN | 111034246 A | 4/2020 |
| EP | 3716692 A1 | 9/2020 |
| KR | 10-2019-0088878 A | 7/2019 |

OTHER PUBLICATIONS

"3rd Generation Partnership Project; Technical Specification Group Services and System Aspects; 5G System (5GS) Location Services (LCS); Stage 2 (Release 16)", 3GPP TS 23.273, V16.2.0, Dec. 2019, pp. 1-91.

"5G; System architecture for the 5G System (5GS) (3GPP TS 23.501 version 15.7.0 Release 15)", ETSI TS 123 501, V15.7.0, Oct. 2019, 250 pages.

"3rd Generation Partnership Project; Technical Specification Group Services and System Aspects; 5G System (5GS) Location Services (LCS); Stage 2 (Release 16)", 3GPP TS 23.273, V16.4.0, Jul. 2020, pp. 1-96.

"3rd Generation Partnership Project; Technical Specification Group Services and System Aspects; Procedures for the 5G System (5GS); Stage 2 (Release 16)", 3GPP TS 23.502, V16.5.1, Aug. 2020, pp. 1-594.

"3rd Generation Partnership Project; Technical Specification Group Services and System Aspects; System architecture for the 5G System (5GS); Stage 2 (Release 16)", 3GPP TS 23.501, V16.5.0, Jul. 2020, pp. 1-441.

"3rd Generation Partnership Project; Technical Specification Group Radio Access Network; NG-RAN; NR Positioning Protocol A (NRPPa) (Release 16)", 3GPP TS 38.455, V16.0.0, Jul. 2020, pp. 1-60.

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.0.0, Mar. 2020, pp. 1-107.

Chinese Office Action corresponding to CN Application No. 202111172708.1, dated Dec. 28, 2023.

European Communication pursuant to Article 94(3) EPC, corresponding to EP Application No. 21 200 630.8, dated Mar. 15, 2024.

* cited by examiner

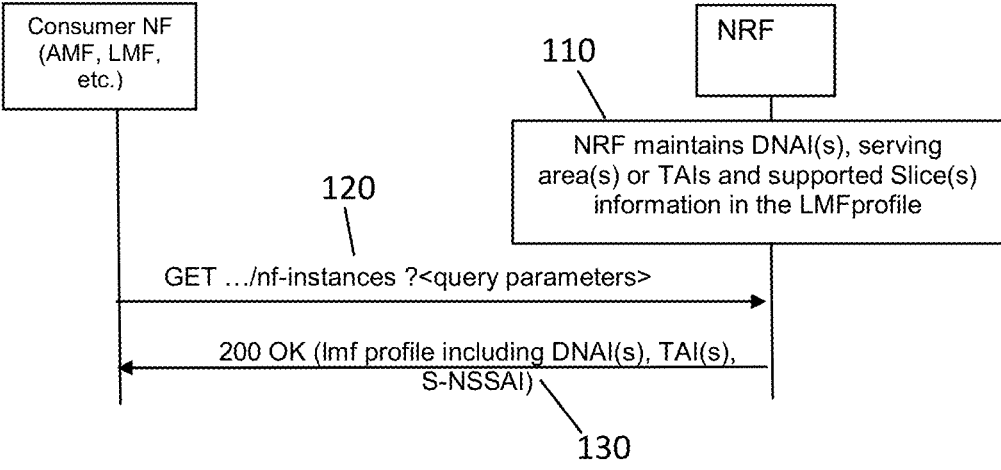

Fig. 1A

| Attribute name | Data type | Description |
|---|---|---|
| sNssai | Snssai | Supported S-NSSAI by LMF |
| dnnLmfInfoList | array(DnnLmfInfoItem) | List of parameters supported by the LMF per DNN |

Fig. 1B

| Attribute name | Data type | Description |
|---|---|---|
| dnn | Dnn | Indicates Supported DNN. The DNN shall contain the Network Identifier and it may additionally contain an Operator Identifier. If the Operator Identifier is not included, the DNN is supported for all the PLMNs in the plmnList of the NF Profile. |
| dnaiList | array(Dnai) | List of Data network access identifiers supported by the LMF for this DNN. The absence of this attribute indicates that the LMF can be selected for this DNN for any DNAI. |

Fig. 1C

405 — Storing, in a LMF profile, data network access identifiers (DNAIs), indication of serving area(s), and/or slice information that is supported by a LMF 410 — Transmitting, to a consumer NF, the LMF profile along with the DNAI(s), indication of serving area(s), or slice information supported by the LMF

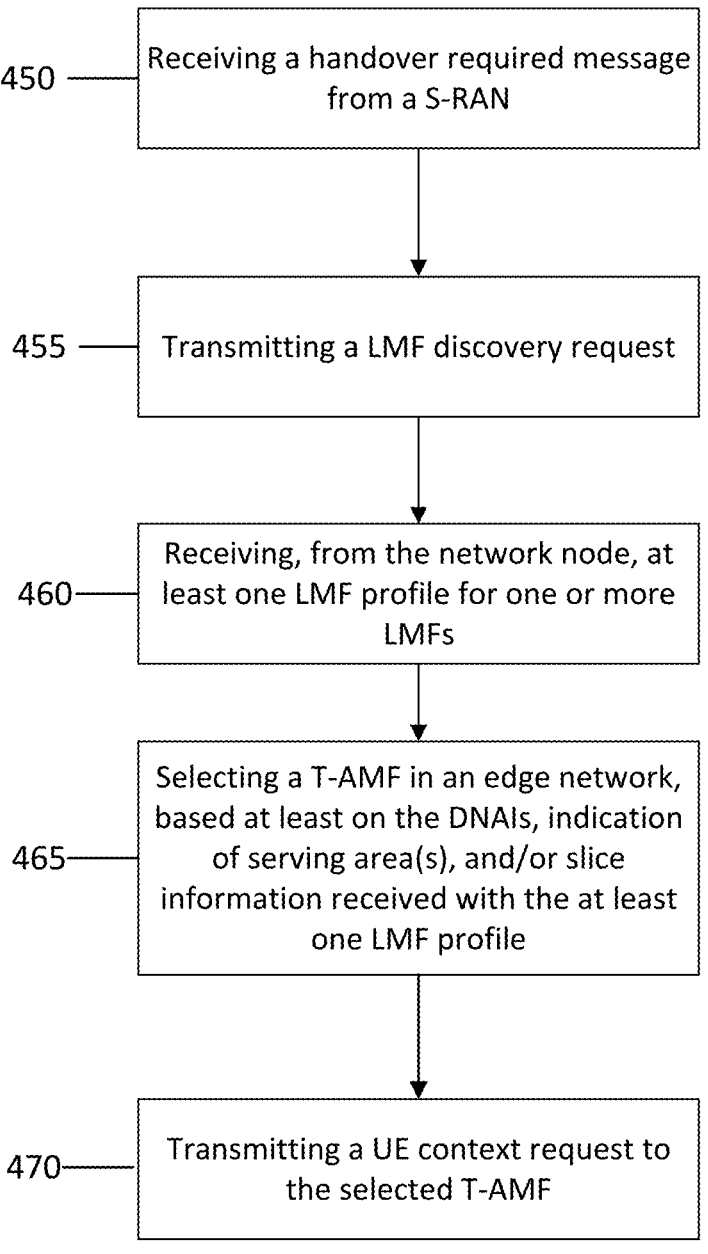

450 — Receiving a handover required message from a S-RAN

455 — Transmitting a LMF discovery request

460 — Receiving, from the network node, at least one LMF profile for one or more LMFs 465 — Selecting a T-AMF in an edge network, based at least on the DNAIs, indication of serving area(s), and/or slice information received with the at least one LMF profile 470 — Transmitting a UE context request to the selected T-AMF

Fig. 4B

480 ──── Transmitting a LMF discovery request to a network node

490 ──── Receiving, from the network node, at least one LMF profile for one or more LMFs, where the at least one LMF profile includes DNAI(s), indication of serving area(s), or slice information supported by the LMF

ENHANCED LOCATION SERVICES IN 5G

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for enhanced location services.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein:

FIG. 1A illustrates an example signaling diagram, according to one example embodiment;

FIG. 1B illustrates examples of additional information that may be stored at a network node or network repository function (NRF), according to an embodiment;

FIG. 1C illustrates examples of additional information that may be stored at a network node or network repository function (NRF), according to an embodiment;

FIG. 4B illustrates an example flow chart of a method, according to an embodiment;

DETAILED DESCRIPTION

Figure 2:
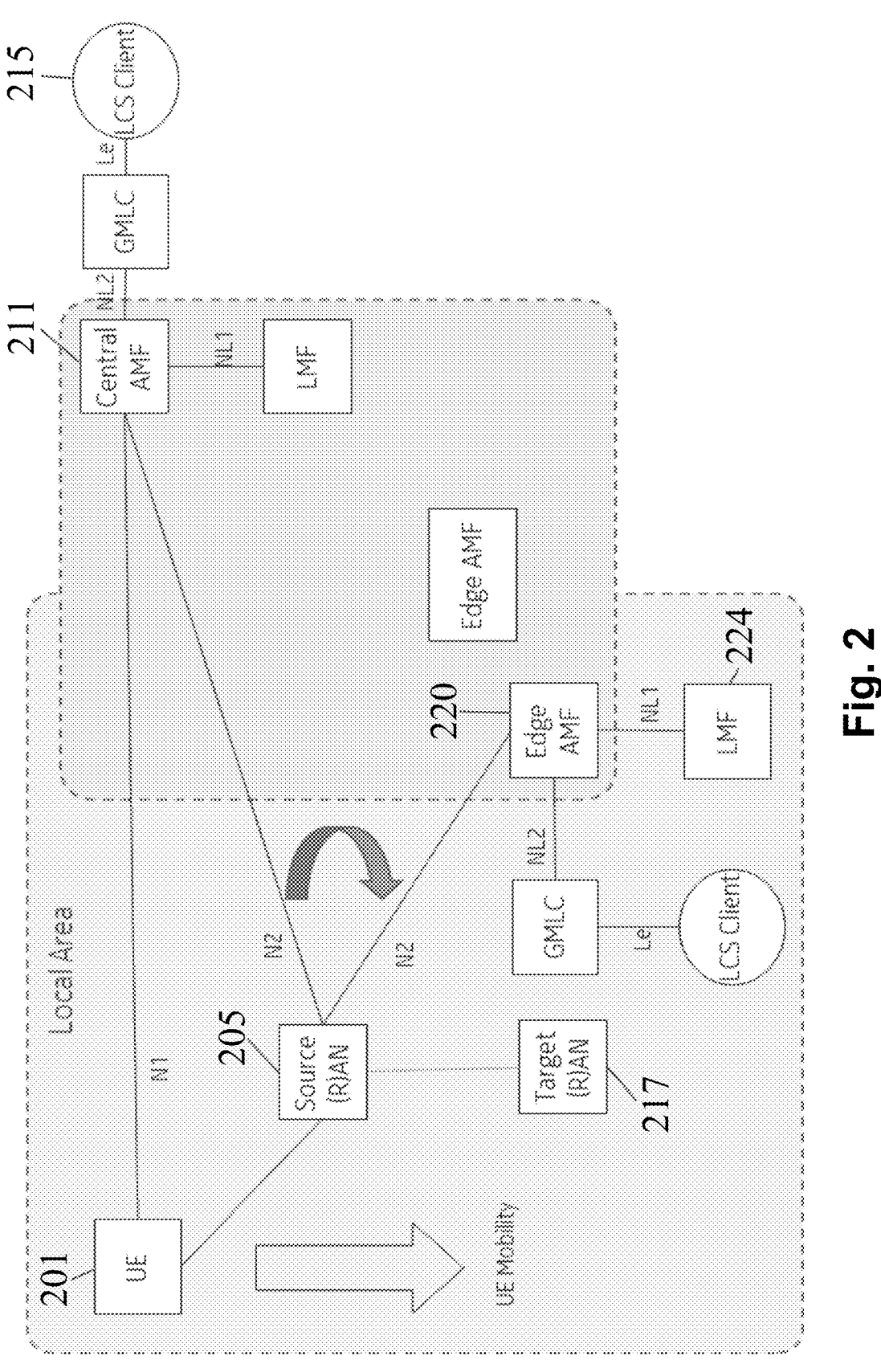
FIG. 2 illustrates an example system diagram depicting UE mobility scenarios with edge network selection, according to one embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for enhanced location services in 5G, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

The location management function (LMF), gateway mobility location centre (GMLC) and access and mobility management function (AMF) are some of the entities with functionalities related to location services (LCS) (e.g., see 3GPP TS 23.501, TS 23.502, TS 23.273, TS 38.455, TS 38.305).

To achieve low latency and high-performance LCS, it may be beneficial to have the involved LMF and AMF at the network edge close to the UE, in order to minimize delays due to signaling between radio access network (RAN) and core network (CN) (i.e., gNB and AMF), and between CN entities (i.e., AMF and LMF).

One deployment scenario of interest for low latency and high-performance LCS is a Local Area Data Network (LADN). An LADN is a data network (DN) that is accessible by the UE only in specific locations, that provides connectivity to a specific Data Network Name (DNN), and whose availability is provided to the UE.

Currently, it is not possible for an AMF and for other Network Functions (NFs) to dynamically know which LMF, if any, is serving the edge network or LADN. This may prevent an AMF (and other NFs) from potentially selecting an optimal LMF located in the edge and/or re-locating the LMF in case of UE mobility to the edge network.

Also, currently, AMF selection as part of UE mobility procedure, which may be triggered due to UE mobility, does not consider LMF requirements. There is no mechanism to ensure continuity of an ongoing LCS session and/or, in cases where a UE at the target location (i.e., target-RAN) requires low latency location services, to ensure that target AMF is selected considering availability of edge LMF.

The AMF Load Balancing functionality permits UEs that are entering into an AMF region/AMF set to be directed to an appropriate AMF in a manner that achieves load balancing between AMFs. This is achieved by setting a weight factor for each AMF, such that the probability of the 5G-AN selecting an AMF is proportional to a weight factor of the AMF. The weight factor is typically set according to the capacity of an AMF node relative to other AMF nodes. The weight factor is sent from the AMF to the 5G-AN via NGAP messages.

There is also a possibility of LMF selection by AMF based on certain criteria such as a duration of event reporting, RAN configuration information, LMF load, and so on. However, currently there are no details and no procedure defined where a LMF can be selected related to LADN or edge data network access identifier (DNAI), etc.

Therefore, certain example embodiments may address and overcome, for example, at least the problems or drawbacks outlined above, as well as addressing other possible issues.

Some example embodiments discussed herein may provide enhanced LMF profile support at network repository function (NRF). It is noted that an NRF may refer to a network node that maintains profiles of available network function (NF) instances and that supports services in 5G core network (5GC) that allows consumer NF instances to discover other providers' NF instances in the 5GC. Additionally, a NRF can allow NF instances to track the status of other NF instances.

An embodiment provides that a NRF may additionally maintain certain attributes specific to a LMF profile, which may then be used by consumer NFs (e.g., in this case AMF and/or LMF) in selecting optimal LMF. These additional attributes may include DNAI and network slice(s) information, or the like. This can then be used, for example, based on Nnrf Discovery services by AMF and other 5G core network functions for different purposes, such as for optimal LMF selection in case of edge application scenarios.

An embodiment may also provide updates to UE mobility procedure, e.g., N2 handover procedure, in order to select an optimal target-AMF and an LMF serving edge network. This can ensure continuity of an ongoing LCS session and/or, in cases where a UE at the target location, i.e., target-RAN requires low latency location services, ensure that the target AMF is selected considering availability of an edge LMF. It is noted that N2 (also called NG) refers to a control plane interface between an access network (e.g., NG-RAN or WLAN) and the 5GC.

As introduced above, certain embodiments may provide for enhanced LMF profile support at NRF for optimal LMF selection. Various factors have been previously specified that may be considered during the LMF selection, such as requested QoS information, LMF load, LMF location, and RAN configuration information. However, it has not been previously specified to provide, in the list of LMF selection criteria, any DNAI information, serving area(s) information and slice specific information. Although, the DNAI information, serving area(s) information and/or slice specific information are important, for example, to ensure selecting a most suitable LMF for edge network and providing location services to LCS clients located close to a particular DNAI.

It has also been specified that LMF selection may be performed at the AMF or LMF based on the locally available information, i.e., the LMF profiles are configured locally at the AMF or LMF, or by querying the NRF. However, the LMF profile at NRF does not provide any information on what DNAI and/or network slices are supported by LMF. Due to unavailability of this information it is not possible, for example, to know and therefore make optimal LMF selection by the requesting NF consumer if the particular LMF is the optimal one for edge network or local access data network (LADN) or for a UE supporting a particular slice. Another example could be the use case where a LCS client requests to delay critical location services. In this case, the AMF will select an LMF that supports URLLC specific slice if this is indicated to be supported for a particular LMF in the LMF profile provided by the NRF (to AMF).

Therefore, in certain embodiments, the LMF profile in the NRF may be enhanced to include information on the supported one or more DNAIs, the serving area in terms of tracking area identifiers (TAIs), and/or the supported network slice(s) information. This may then be retrieved by a NF consumer (e.g., AMF and/or LMF) using, for example, Nnrf_NFDiscovery service operation. In an embodiment, the LMF profile may be configured and stored at the NRF using an operations, administration and maintenance (OAM) procedure and/or LMF instance may register itself to the NRF that provides the information.

FIG. 1A illustrates an example signaling diagram showing LMF profile discovery by consumer NF(s), according to one example embodiment. More specifically, FIG. 1A illustrates an example LMF profile retrieval procedure from a NRF by consumer NF(s), such as an AMF and/or LMF. As illustrated in the example of FIG. 1A, at 110, the NRF may maintain or store additional information as part of LMF Profile. For example, this additional information may include DNAI(s), serving area(s) or TAI(s), and/or supported slice(s) information. The consumer NF may then query, at 120, the NRF for the LMF profile and/or DNAI(s), serving area(s)/TAI(s), and/or supported slice(s) information. As also illustrated in the example of FIG. 1A, the NRF may provide, at 130, the requested LMF profile including the DNAI(s), serving area(s) or TAI(s), and/or supported slice(s) information to the consumer NF.

FIG. 1B and FIG. 1C illustrate examples of the additional information that may be stored at the NRF as part of the LMF profile. For instance, as illustrated in FIG. 1B, the NRF may maintain single network slice selection assistance information (S-NSSAI) supported by the LMF and the list of parameters supported by the LMF per DNN (dnnLmfInfoList). As illustrated in FIG. 1C, the NRF may also maintain the supported DNN and a list of data network access identifiers (dnaiList) supported by the LMF for this DNN.

Some example embodiments may relate to AMF relocation considering a location service requirement. An embodiment provides an enhancement to the AMF selection procedure to enable a serving AMF (e.g., in case of AMF re-location due to UE mobility and eventually UE camping at the target-RAN) to select the most suitable AMF that can better serve services requested by edge clients, such as a LCS client. This scenario may support UE mobility and request edge network or LADN type services. Selecting AMF instance(s) and LMF services that support and are located optimally to serve the edge network or LADN services can additionally help to offload core network traffic and to reduce or avoid signalling going deep in the core network.

FIG. 2 illustrates an example system diagram depicting UE mobility scenarios with edge network selection, according to one embodiment. Certain embodiments may provide updates to a UE mobility procedure, e.g., N2 handover procedure in order to select an optimal target AMF and an LMF serving edge network. This ensures continuity of an ongoing LCS session and/or, in cases where a UE at the target location, i.e., target-RAN requires low latency location services, ensures that a target AMF is selected considering the availability of edge LMF.

As shown in the example of FIG. 2, a UE 201 before mobility was connected to a source-RAN 205, which has selected AMF 211 located deep in the network 250 and referred to herein as "Central AMF". The AMF 211 may be also serving a LCS client 215 request as shown in the example of FIG. 2. Furthermore, FIG. 2 also highlights a UE mobility scenario whereby, due to mobility of UE 201, S-RAN 205 may trigger a AMF relocation via N2 interface. During the handover process, source AMF 211 may decide on and select a target AMF 220 that can better serve the target-RAN 217. According to an embodiment, source AMF 211 may also consider any delay critical location services request or request specific to an edge network and availability of an LMF in the edge network, such as LMF 224 in the example of FIG. 2, as its AMF selection criteria, along with other criteria that may additionally already be configured. This can be useful in reducing round trip delay, helps keep signalling local, i.e., within the edge network, better serving delay critical location (and other) service request, and so on.

Figure 3:
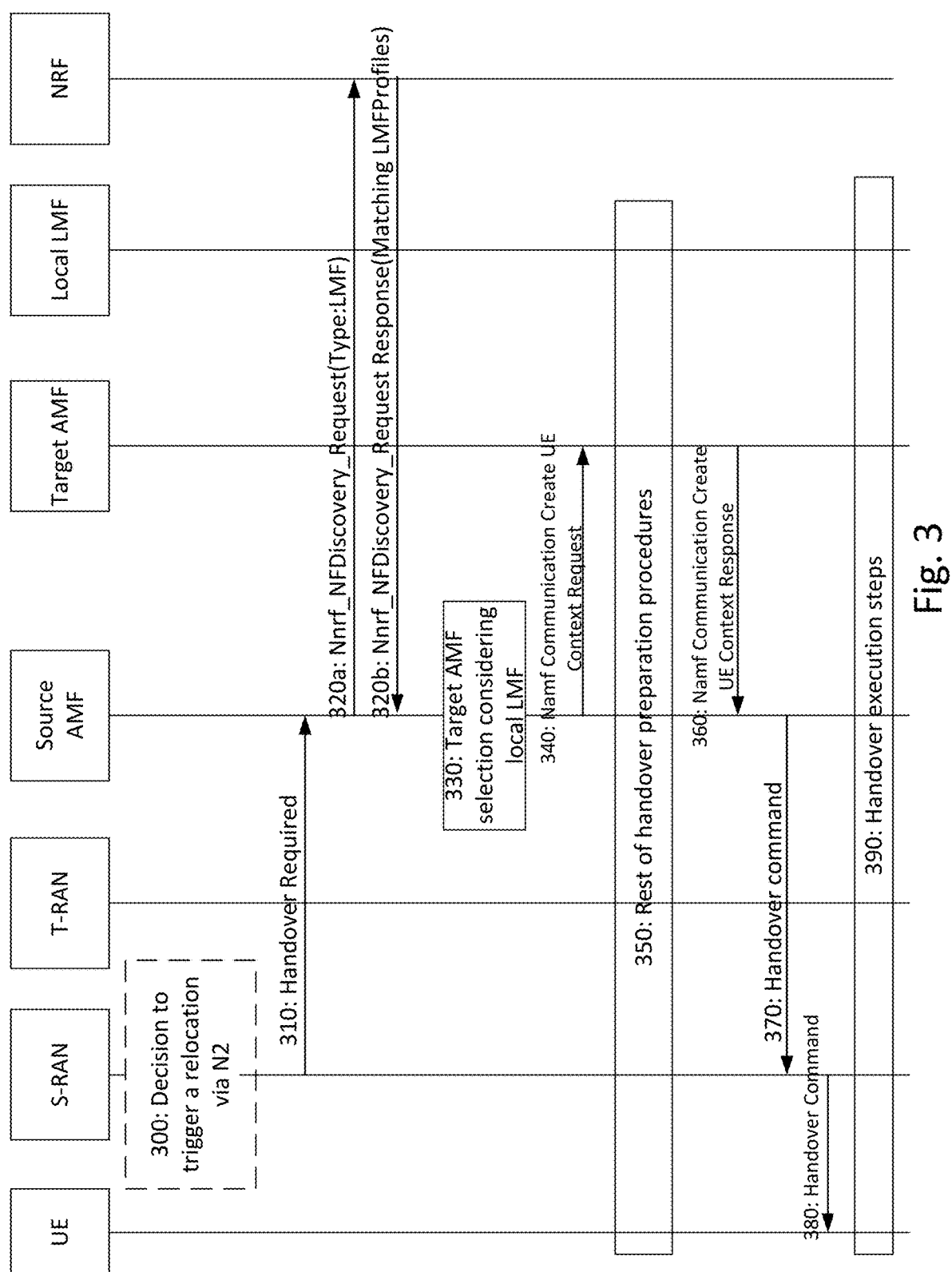
FIG. 3 illustrates an example system diagram depicting UE mobility scenarios with edge network selection, according to one embodiment.

FIG. 3 illustrates an example signaling diagram of an AMF re-location considering a location service requirement, according to an embodiment. More specifically, FIG. 3 shows an example embodiment of an N2 handover procedure with AMF relocation that additionally considers delay critical location services request or LMF availability in the edge network as its AMF selection criteria. In some embodiments, LMF availability in the edge network may be determined by LMF profile received from NRF.

As illustrated in the example of FIG. 3, at 300, a source RAN (S-RAN) may decide to initiate an N2-based handover to a target RAN (T-RAN). The decision to initiate handover may be due to, for example, new radio conditions due to UE mobility or load balancing, if there is no Xn connectivity to the T-RAN, an error indication from the T-RAN after an unsuccessful Xn-based handover (i.e., no IP connectivity between T-RAN and S-UPF), or based on dynamic information learned by the S-RAN, or the like.

As further illustrated in the example of FIG. 3, at 310, the S-RAN may send, to a source AMF (S-AMF), a handover required message, e.g., which may include target ID, source to target transparent container, SM N2 information list, PDU session IDs, intra system handover indication, etc. In an embodiment, at 320a, the S-AMF may send a discovery request (Nnrf_NFDiscovery_Request) to a NRF and may obtain, at 320b, one or more matching LMF profiles in the (Nnrf_NFDiscovery_Request) response message, which indicates if any LMF is serving the T-RAN area, i.e., TAIs, local DNAI, etc.

In the example of FIG. 3, at 330, the S-AMF may select a target AMF (T-AMF) based on the "AMF Selection Function". When selecting the T-AMF, the S-AMF additionally considers the availability of LMF in the candidate T-AMF based on a serving area indication in the T-AMF profile. As shown in the example of FIG. 3, at 340, the S-AMF may send, to the T-AMF, a request to create a UE context (Namf_Communication_CreateUEContext Request).

As further illustrated in the example of FIG. 3, at 350, the remainder of the handover preparation procedures may be performed. For example, the handover preparation procedures performed at 350 may include the procedures as specified in 3GPP TS 23.502 v16.5.1. At 360, a create UE context response (Namf_Communication_CreateUEContext Response) may be sent by the T-AMF to the S-AMF. At 370, a handover command may be sent by the S-AMF to the S-RAN. Then, at 380, a handover command may be provided from the S-RAN to the UE and, at 390, the handover execution procedures may be executed. Again, as an example, the handover execution procedures performed at 390 may include the procedures as specified in 3GPP TS 23.502 v16.5.1.

Figure 4A:
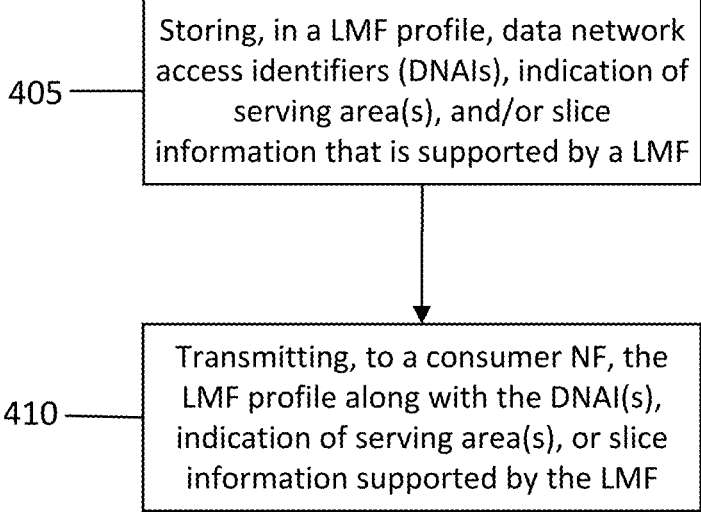
FIG. 4A illustrates an example flow chart of a method, according to an embodiment.

FIG. 4A illustrates an example flow chart of a method of maintaining certain attributes specific to a LMF profile, which can be used in selecting an optimal LMF, according an embodiment. In certain example embodiments, the flow diagram of FIG. 4A may be performed by a network entity or network node in a communications system, such as LTE or 5G NR. In some example embodiments, the network entity performing the method of FIG. 4A may include or be included in a base station, access node, node B, eNB, gNB, NG RAN node, or the like. In one example embodiment, the method of FIG. 4A may be performed by a network repository function (NRF) or other node that maintains profiles of available NF instances, such as the NRF depicted in the example diagrams of FIG. 1A or FIG. 3.

As illustrated in the example of FIG. 4A, the method may include, at 405, storing, in a LMF profile, one or more data network access identifiers (DNAIs), indication of serving area(s) (e.g., in terms of TAIs), and/or slice information that is supported by a LMF. For example, the storing 405 may include storing any of the information illustrated in the examples of FIG. 1B and/or FIG. 1C. In some embodiments, the storing 405 may include storing the LMF profile using an OAM procedure or via registration of LMF instances that provide the information on the supported DNAI(s), serving area(s) (e.g., TAIs), and/or slice information.

As further illustrated in the example of FIG. 4A, the method may include, at 410, transmitting, to a consumer NF, the LMF profile along with the DNAI(s), indication of serving area(s), or slice information supported by the LMF. According to some examples, the consumer NF may be an AMF and/or LMF. According to some embodiments, the transmitting 410 may include transmitting the LMF profile in response to receiving a LMF discovery request, e.g., a Nnrf_NFDiscovery service request, from the consumer NF.

FIG. 4B illustrates an example flow chart of a method of selecting an AMF that can best serve services requested by edge clients, such as a LCS client, according an embodiment. In certain example embodiments, the flow diagram of FIG. 4B may be performed by a network entity or network node in a communications system, such as LTE or 5G NR. In some example embodiments, the network entity performing the method of FIG. 4B may include or be included in a base station, access node, node B, eNB, gNB, NG RAN node, or the like. In one example embodiment, the method of FIG. 4B may be performed by a consumer NF, AMF, LMF, or the like, such as the consumer NF depicted in the example diagram of FIG. 1A or the source AMF depicted in FIG. 3.

As illustrated in the example of FIG. 4B, the method may include, at 450, receiving a handover required message from a S-RAN. For instance, the handover may include an N2 handover procedure. The method may also include, at 455, transmitting a LMF discovery request, e.g., Nnrf_NFDiscovery request, to a network node. In an embodiment, the network node to which the LMF discovery request is transmitted may include a NRF. As an example, the transmitting 455 of the LMF discovery request may be performed in response to receiving the handover required message from the S-RAN.

In some embodiments, as illustrated in the example of FIG. 4B, the method may also include, at 460, receiving, from the network node, at least one LMF profile for one or more LMFs. According to one example embodiment, the receiving 460 may include receiving LMF profile(s) for LMF(s) that may be serving an edge network or LADN corresponding to the UE's new location. The at least one LMF profile(s) may include at least one of DNAIs, indication of serving area(s) (e.g., TAIs), and/or slice information supported by a LMF. As further illustrated in the example of FIG. 4B, the method may include, at 465, selecting a T-AMF in an edge network, based at least on the DNAIs, indication of serving area(s), and/or slice information received with the at least one LMF profile. According to certain embodiments, the selecting 465 may further include selecting the T-AMF also considering if there are delay critical location service(s) or LMF in the edge network. For example, an availability of a LMF in the edge network may be determined by the LMF profile received at 460. Further, in some embodiments, the method may include selecting a LMF serving the edge network. According to an embodiment, the method of FIG. 4B may include, at 470, transmitting a UE context request to the selected T-AMF.

Figure 4C:
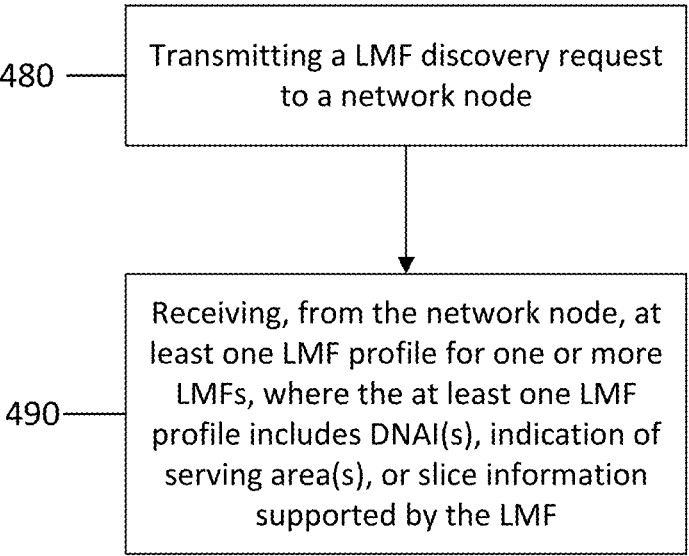
FIG. 4C illustrates an example flow chart of a method, according to an embodiment.

FIG. 4C illustrates an example flow chart of a method of selecting an AMF that can best serve services requested by edge clients, such as a LCS client, according one embodiment. In some example embodiments, the flow diagram of FIG. 4C may be performed by a network entity or network node in a communications system, such as LTE or 5G NR. In certain example embodiments, the network entity performing the method of FIG. 4C may include or be included in a base station, access node, node B, eNB, gNB, NG RAN node, or the like. In one example embodiment, the method of FIG. 4C may be performed by a consumer NF, AMF, LMF, or the like, such as the consumer NF depicted in the example diagram of FIG. 1A or the source AMF depicted in FIG. 3.

As illustrated in the example of FIG. 4C, the method may include, at 480, transmitting a LMF discovery request to a network node. For example, in an embodiment, the LMF discovery request may be a Nnrf_NFDiscovery request. In an embodiment, the network node to which the LMF discovery request is transmitted may include a NRF. In some embodiments, as illustrated in the example of FIG. 4C, the method may also include, at 490, receiving, from the network node, at least one LMF profile for one or more LMFs, where the at least one LMF profile may include at least one of DNAIs, indication of serving area(s) (e.g., TAIs), and/or slice information supported by a LMF. According to one example embodiment, the receiving 490 may include receiving LMF profile(s) for LMF(s) that may be serving an edge network or LADN corresponding to the UE's new location.

Figures 5A, 5B, 5C:
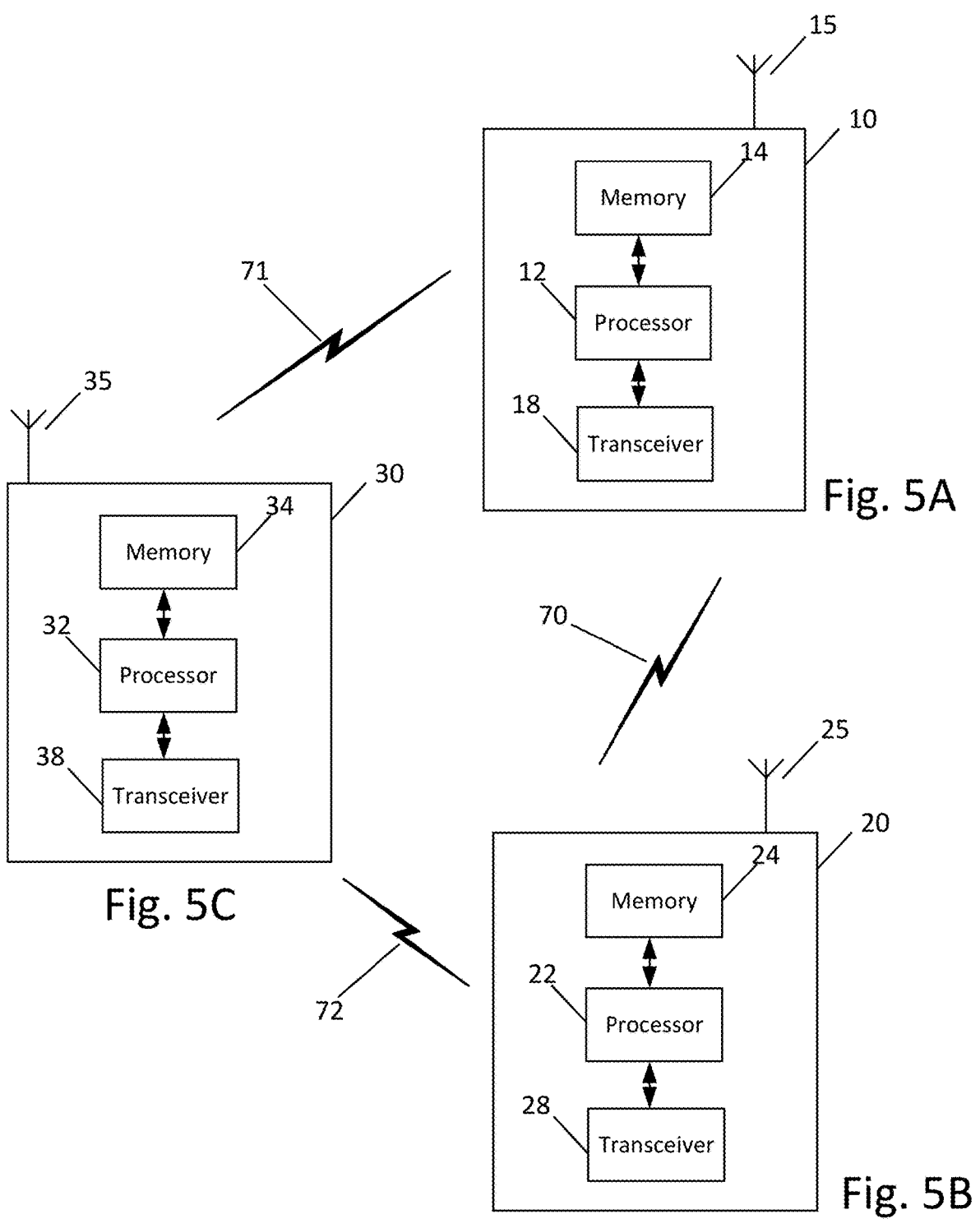
FIG. 5A illustrates an example block diagram of an apparatus, according to an embodiment.
FIG. 5B illustrates an example block diagram of an apparatus, according to an embodiment.
FIG. 5C illustrates an example block diagram of an apparatus, according to an embodiment.

FIG. 5A illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), transmission receive point (TRP), high altitude platform station (HAPS), integrated access and backhaul (IAB) node, and/or WLAN access point, associated with a radio access network, such as a LTE network, 5G or NR. In one example embodiment, apparatus 10 may represent a control node in a S-RAN, such as that illustrated in FIG. 3.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5A.

As illustrated in the example of FIG. 5A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples.

While a single processor 12 is shown in FIG. 5A, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and/or receive information. The transceiver 18 may include, for example, a plurality of radio interfaces that may be coupled to the antenna(s) 15, or may include any other appropriate transceiving means. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (e.g., digital-to-analog converters and the like), mappers, a Fast Fourier Transform (FFT) module, and/or the like, e.g., to generate symbols or signals for transmission via one or more downlinks and to receive symbols (e.g., via an uplink).

As such, transceiver 18 may be configured to modulate information on to a carrier waveform for transmission by the antenna(s) 15 and to demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input device and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, TRP, HAPS, IAB node, WLAN access point, or the like. In one example embodiment, apparatus 10 may be a network node in a S-RAN, e.g., the S-RAN illustrated in the example of FIG. 3. For example, in some embodiments, apparatus 10 may be configured to perform one or more of the processes depicted in any of the flow charts or signaling diagrams described herein, such as those illustrated in FIG. 1, 3 or 4A, 4B or 4C. In some embodiments, as discussed herein, apparatus 10 may be configured to perform a procedure relating to LMF selection and/or AMF relocation, for example.

In some embodiments, apparatus 10 may be controlled by memory 14 and processor 12 to decide to trigger a relocation, e.g., via a N2 handover procedure. According to an embodiment, apparatus 10 may then be controlled by memory 14 and processor 12 to transmit a handover required message to a S-AMF, i.e., an AMF associated with the source network. According to certain embodiments, apparatus 10 may be controlled by memory 14 and processor 12 to receive a handover command from the S-AMF and to provide the handover command to a UE so that the handover can be executed.

FIG. 5B illustrates an example of an apparatus 20 according to another embodiment. In an embodiment, apparatus 20 may be a node or element in a communications network or associated with such a network, such as a satellite, base station, a Node B, an evolved Node B (eNB), 5G Node B or access point, next generation Node B (NG-NB or gNB), and/or WLAN access point, associated with a radio access network, such as a LTE network, 5G or NR. According to one embodiment, apparatus 20 may be or may be included in a network repository function (NRF) or other node that maintains profiles of available NF instances, such as the NRF depicted in the example diagrams of FIG. 1A or FIG. 3.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 5B.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5B.

As illustrated in the example of FIG. 5B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some embodiments, apparatus 20 may be a network repository function (NRF) or other node that maintains profiles of available NF instances, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1, 3, 4A, 4B or 4C. In certain embodiments, apparatus 20 may include or represent a NRF, such as one or more of the NRFs illustrated in the figures and discussed elsewhere herein. According to an embodiment, apparatus 20 may be configured to perform a procedure relating to LMF selection and/or AMF relocation, for instance.

In certain embodiments, apparatus 20 may be controlled by memory 24 and processor 22 to store, in a LMF profile, at least one or more DNAIs, indication of serving area(s) (e.g., in terms of TAIs), and/or slice information that is supported by a LMF. For example, apparatus 20 may be controlled by memory 24 and processor 22 to store any of the information illustrated in the examples of FIG. 1B and/or FIG. 1C. In some embodiments, apparatus 20 may be controlled by memory 24 and processor 22 to store the LMF profile using an OAM procedure or via registration of LMF instances that provide the information on the supported DNAI(s), serving area(s) (e.g., TAIs), and/or slice information.

According to an embodiment, apparatus 20 may be controlled by memory 24 and processor 22 to transmit, to a consumer NF, the LMF profile including the DNAI(s), indication of serving area(s), or slice information supported by the LMF. According to some examples, the consumer NF may be an AMF and/or LMF. According to some embodiments, apparatus 20 may be controlled by memory 24 and processor 22 to transmit the LMF profile in response to receiving a LMF discovery request, e.g., a Nnrf_NFDiscovery service request, from the consumer NF.

FIG. 5C illustrates an example of an apparatus 30 according to another example embodiment. In an example embodiment, apparatus 30 may be a node or element in a communications network or associated with such a network, such as a satellite, base station, a Node B, an evolved Node B (eNB), 5G Node B or access point, next generation Node B (NG-NB or gNB), and/or WLAN access point, associated with a radio access network, such as a LTE network, 5G or NR. According to one embodiment, apparatus 30 may be or may be included in a consumer NF, such as an AMF or LMF, for example.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 5C.

As illustrated in the example of FIG. 5C, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 5C, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a consumer NF, such as an AMF or LMF, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein, such as the process illustrated in the examples of FIG. 1, 3, 4A, 4B or 4C. As an example, apparatus 30 may correspond to or represent a s-AMF, such as one or more of the S-AMFs illustrated in the example of FIG. 1 or 3. According to certain example embodiments, apparatus 30 may be configured to perform a procedure relating to LMF selection and/or AMF relocation, for instance.

In some embodiments, apparatus 30 may be controlled by memory 34 and processor 32 to receive a handover required message from a S-RAN. For instance, the handover may include an N2 handover procedure. According to an embodiment, apparatus 30 may be controlled by memory 34 and processor 32 to transmit a LMF discovery request, e.g., Nnrf_NFDiscovery request, to a network node. In an embodiment, the network node to which the LMF discovery request is transmitted may include a NRF. As an example, apparatus 30 may be controlled by memory 34 and processor 32 to transmit the LMF discovery request in response to receiving the handover required message from the S-RAN.

In some embodiments, apparatus 30 may be controlled by memory 34 and processor 32 to receive, from the network node, at least one LMF profile for one or more LMFs. In one example embodiment, the LMF(s) may include those serving an edge network Or LADN corresponding to the UE's new location. The at least one LMF profile may include at least one of DNAIs, indication of serving area(s) (e.g., TAIs), and/or slice information supported by a LMF. According to an embodiment, apparatus 30 may be controlled by memory 34 and processor 32 to select a T-AMF in an edge network, based at least on the DNAIs, indication of serving area(s), and/or slice information received with the at least one LMF profile. In some embodiments, apparatus 30 may be controlled by memory 34 and processor 32 to select a LMF serving the edge network. According to an embodiment, apparatus 30 may be controlled by memory 34 and processor 32 to transmit a UE context request to the selected T-AMF.

In some embodiments, an apparatus (e.g., apparatus 10 and/or apparatus 20 and/or apparatus 30) may include means for performing a method or any of the procedures or variants discussed herein, e.g., a method described with reference to FIG. 4A, 4B or 4C. Examples of the means may include one or more processors, memory, and/or computer program code for causing the performance of the operation.

Therefore, certain example embodiments provide several technological improvements, enhancements, and/or advantages over existing technological processes and constitute an improvement at least to the technological field of wireless network control and management. For example, as discussed in detail in the foregoing, certain example embodiments provide enhanced LMF profile support to enable optimal LMF selection. Furthermore, some example embodiments provide for AMF re-location, e.g., considering location service requirements. As a result, an advantage of certain embodiments is to enable the selecting of an optimal LMF, the selecting of the most suitable AMF that can best serve services requested by edge clients. In other words, certain embodiments result in the selection of AMF instance(s) and LMF services that support and are located optimally to serve the edge network or LADN services to help offload core network traffic and to reduce or avoid signaling deep into the core network. Moreover, certain embodiments can ensure continuity of an ongoing LCS session and/or, in cases where UE at the target location, ensures that a target AMF is selected considering the availability of an edge LMF. In addition, some embodiments can reduce round trip delay, help keep signaling local, e.g., within the edge network, better serving delay critical location (and other) service requests. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:
at least one processor; and
at least one memory storing instructions which, when executed by the at least one processor, cause the apparatus at least to:
determine to change a first location management function that serves a user equipment, the determination to change the first location management function being based on an updated location of the user equipment, and a change from a first access and mobility management function that served the user equipment to a second access and mobility management function that serves the user equipment;
transmit, to a network node, a location management function discovery request, based on the determination to change the first location management function;
receive, from the network node, a plurality of location management function profiles, based on the location management function discovery request,
wherein the plurality of location management function profiles comprise a location management function profile of a second location management function,
the location management profile of the second location management function comprises an indication of serving area, and slice information,
the indication of serving area comprises at least one tracking area identifier, and
the at least one tracking area identifier and the slice information are stored in the location management function profile of the second location management function via registration of an instance of the second location management function; and
select the second location management function for the updated location of the user equipment and the second access and mobility management function, based on the at least one tracking area identifier and the slice information stored in the location management function profile of the second location management function.

2. The apparatus according to claim 1,
wherein the instructions, when executed by the at least one processor, cause the apparatus at least to:
receive, from a source radio access network, a handover required message for the user equipment,
wherein the determination to change the first location management function that serves the user equipment is based on the updated location of the user equipment indicated by the handover required message received from the source radio access network.

3. The apparatus according to claim 1,
wherein the network node comprises a network repository function.

4. The apparatus according to claim 1,
wherein the location management function profile of the second location management function further comprises a data network access identifier, and the data network access identifier comprises an edge data network access identifier.

5. The apparatus according to claim 1,
wherein the slice information comprises single network slice selection assistance information.

6. The apparatus according to claim 1,
wherein the second access and mobility management function is selected as a target access and mobility management function to serve the user equipment prior to the selection of the second location management function for the updated location of the user equipment and the second access and mobility management function.

7. The apparatus according to claim 6,
wherein the at least one memory and computer program code are configured instructions, when executed by the at least one processor, cause the apparatus at least to:
transmit a user equipment context request to the selected target access and mobility management function.

8. The apparatus according to claim 1,
wherein the apparatus comprises a consumer network function.

9. The apparatus according to claim 8,
wherein the consumer network function comprises at least one of the first access and mobility management function or a location management function,
the first access and mobility management function is a source access and mobility management function, and
the second access and mobility management function is a target access and mobility management function.

10. The apparatus according to claim 1,
wherein use of the second location management function with the second access and mobility management function is configured to reduce core network resource utilization compared to use of the first location management function with the second access and mobility management function.

11. A method, comprising:
determining to change a first location management function that serves a user equipment, said determining to change the first location management function being based on an updated location of the user equipment, and a change from a first access and mobility management function that served the user equipment to a second access and mobility management function that serves the user equipment;
transmitting, to a network node, a location management function discovery request, based on said determining to change the first location management function;
receiving, from the network node, a plurality of location management function profiles, wherein the plurality of location management function profiles comprise a location management function profile of a second location management function, the location management profile of the second location management function comprises an indication of serving area, and slice information, the indication of serving area comprises at least one tracking area identifier, and the at least one tracking area identifier and the slice information are stored in the location management function profile via registration of an instance of the second location management function; and selecting the second location management function for the updated location of the user equipment and the second access and mobility management function, based on the at least one tracking area identifier and the slice information stored in the location management function profile of the second location management function.

12. The method according to claim 11, further comprising:

receiving, from a source radio access network, a handover required message for the user equipment, wherein said determining to change the first location management function is based on the updated location of the user equipment indicated by the handover required message received from the source radio access network.

13. The method according to claim 11, wherein the network node comprises a network repository function.

14. The method according to claim 11, wherein the second access and mobility management function is selected as a target access and mobility management function to serve the user equipment prior to said selecting the second location management function for the updated location of the user equipment and the second access and mobility management function.

15. The method according to claim 11, wherein said selecting the second location management function for the updated location of the user equipment and the second access and mobility management function is performed by a consumer network function.

16. The method according to claim 15, wherein the consumer network function comprises at least one of the first access and mobility management function or a location management function, the first access and mobility management function is a source access and mobility management function, and the second access and mobility management function is a target access and mobility management function.

17. A method, comprising:

receiving, from a consumer network function, a location management function discovery request, based on a determination to change a first location management function that serves a user equipment, the determination to change the first location management function being based on an updated location of the user equipment, and a change from a first access and mobility management function that served the user equipment to a second access and mobility management function that serves the user equipment; and transmitting, to the consumer network function, a plurality of location management function profiles, based on the location management function discovery request, wherein the plurality of location management function profiles comprise a location management function profile of a second location management function, the location management profile of the second location management function comprises an indication of serving area, and slice information, the indication of serving area comprises at least one tracking area identifier, the at least one tracking identifier and the slice information are stored in the location management function profile of the second location management function, at a network node, via registration of an instance of the second location management function to the network node, wherein said transmitting the plurality of location management function profiles enables a selection of the second location management function for the updated location of the user equipment and the second access and mobility management function, based on the at least one tracking area identifier and the slice information stored in the location management function profile of the second location management function.

18. The method according to claim 17, wherein the location management function profile of the second location management function further comprises a data network access identifier, and the data network access identifier is stored in the location management function profile of the second location management function, at the network node, using an operations, administration and maintenance procedure or via registration of the instance of the second location management function to the network node.

19. The method according to claim 18, wherein the data network access identifier comprises an edge data network access identifier.

20. The method according to claim 17, wherein the slice information comprises single network slice selection assistance information.

* * * * *